(12) United States Patent
Reid et al.

(10) Patent No.: US 7,680,374 B2
(45) Date of Patent: Mar. 16, 2010

(54) APODISED BINARY BRAGG GRATING

(75) Inventors: Douglas Charles John Reid, Warwickshire (GB); Andrew John Ward, Northamptonshire (GB)

(73) Assignee: Oclaro Technology plc, Northamptonshire (GB)

( * ) Notice: Subject to any disclaimer, the term of this patent is extended or adjusted under 35 U.S.C. 154(b) by 0 days.

(21) Appl. No.: 11/575,580

(22) PCT Filed: Sep. 29, 2005

(86) PCT No.: PCT/GB2005/050166

§ 371 (c)(1),
(2), (4) Date: Mar. 20, 2007

(87) PCT Pub. No.: WO2006/035245

PCT Pub. Date: Apr. 6, 2006

(65) Prior Publication Data

US 2007/0217742 A1    Sep. 20, 2007

(30) Foreign Application Priority Data

Sep. 29, 2004   (GB) .................................. 0421563.8

(51) Int. Cl.
*G02B 6/34* (2006.01)
(52) U.S. Cl. .............................. 385/37; 385/10; 359/575
(58) Field of Classification Search .................. 385/37, 385/9, 10, 14, 42, 43, 131, 30, 2, 27, 129; 372/102, 96, 20, 43; 359/575
See application file for complete search history.

(56) References Cited

U.S. PATENT DOCUMENTS

| 5,497,393 | A | * | 3/1996 | Lee ............................. 372/96 |
| 5,668,900 | A | | 9/1997 | Little et al. |
| 5,887,094 | A | * | 3/1999 | Bakhti et al. .................. 385/28 |
| 6,141,370 | A | | 10/2000 | Avrutsky et al. |
| 7,123,792 | B1 | * | 10/2006 | Mears et al. .................. 385/37 |
| 2004/0021945 | A1 | * | 2/2004 | Tompkin et al. ............ 359/566 |
| 2008/0232411 | A1 | * | 9/2008 | Reid et al. .................... 372/20 |
| 2008/0240175 | A1 | * | 10/2008 | Reid et al. .................... 372/20 |

FOREIGN PATENT DOCUMENTS

| WO | 01/11401 | 2/2001 |
| WO | 03/044578 | 5/2003 |

OTHER PUBLICATIONS

International Search Report for corresponding Application No. PCT/GB2005/050166 mailed Dec. 5, 2005.

(Continued)

*Primary Examiner*—Ellen Kim
(74) *Attorney, Agent, or Firm*—Renner, Otto, Boisselle & Sklar, LLP

(57) ABSTRACT

An apodised Bragg grating comprises a base grating section formed by a base order 5 periodic pattern of marks and spaces. The Bragg grating further comprises one or more apodised grating sections that are formed by a periodic pattern of marks and spaces, each defined by the base order pattern from which at least some of the marks are missing. The determination of which marks are missing may be performed by combining the base order pattern with a higher order modulation envelope function.

15 Claims, 5 Drawing Sheets

OTHER PUBLICATIONS

Great Britain Search Report for corresponding Application No. 0421563.8 dated Nov. 17, 2004.
International Preliminary Report on Patentability for corresponding Application No. PCT/GB2005/050166.

Avrutsky et al.; "Multiwavelength Diffraction and Apodization Using Binary Superimposed Gratings"; IEEE Photonics Technology Letters, IEEE Service Center; Piscataway, NJ, US; vol. 10, No. 6; Jun. 1998, pp. 839-841; XP000783518.

* cited by examiner

APODISED BINARY BRAGG GRATING

BACKGROUND OF THE INVENTION

1. Field of the Invention

The present invention relates to an apodised binary grating. In particular, although not exclusively, the invention relates to the apodisation of distributed Bragg gratings for use in optical fibres and devices.

2. Description of the Related Art

It will be understood that the terms "optical" and "optoelectronic" are used in this specification in a non-specific sense, that is so as to cover use with radiation in the visible and non-visible parts of the spectrum, and so as not to be limited to use with visible light. Similarly, it will be understood that use of the term "light" may apply to electromagnetic radiation of any frequency, and is not limited to light in the visible spectrum. Further it will be understood that the use of the term "waveguide" describes a structure that guides light and which may comprise a plurality of layers.

Distributed Bragg gratings are commonly found in optical fibres and semiconductor optical devices. Such gratings in optical fibres are known as "Fibre Bragg Gratings" (FBGs) and those in semiconductor optical devices as "Distributed Bragg Reflectors" (DBRs).

In its simplest form, a Bragg grating comprises a periodic modulation of the refractive index of a waveguide. Light is scattered at each change in refractive index. If the Bragg condition is satisfied, the light reflected at each of the grating planes interferes constructively. The Bragg condition is defined as $\lambda_B = 2n_{eff}\Lambda$, where $\lambda_B$ is the wavelength of the incident light, $n_{eff}$ is the effective refractive index of the waveguide, and $\Lambda$ is the pitch of the modulation. A grating of constant pitch and reflective strength thus produces a reflection of light of a wavelength of twice the effective pitch of the grating, where the effective pitch differs from actual pitch by a factor of $n_{eff}$.

However, as well as a reflective peak at the principle wavelength ($\lambda_B$) the grating also produces other unwanted reflections (typically smaller than the principle peak) at side wavelengths, due to the abrupt termination of the grating caused by its finite length. Bragg gratings can be adapted to reflect a range of wavelengths, and these are known as chirped gratings. The pitch of a chirped grating varies along the length of the grating, typically monotonically. Chirped gratings are often used in tunable semiconductor lasers, and an example is shown in WO03/012936. Further examples may be seen in U.S. Pat. No. 6,771,687, which provides an example of how FBGs may be used in an FBG stabilised laser, and U.S. Pat. No. 6,345,135, which illustrates applications of DBRs in semiconductor optoelectronic devices. A chirped grating of constant reflective strength can produce a reflection spectrum (reflectivity plotted against wavelength) in the shape of a "top hat", i.e. the reflection of the grating is substantially uniform within a specific wavelength range. However, the finite length of the grating again causes unwanted peaks in the reflection spectrum, the two largest of which will typically coincide in wavelength with the ends of the top hat profile, producing raised peaks at the ends of the profile with higher reflectivity than the middle section.

It is known in the art that controlling the reflectivity of the grating, in particular close to the ends of the grating, can be used to overcome the problems of unwanted peaks caused by the finite length and abrupt termination of the grating, in both constant pitch and chirped gratings. This is known as apodisation. Apodisation can also be applied to other similar 'end effects' in other types of known grating. In the context of distributed Bragg gratings, the term apodisation is generally used to describe varying the strength of the grating (i.e. the reflectivity) as a function of grating length.

Known techniques for achieving apodisation of Bragg gratings are described in "Fiber Bragg Gratings" by Raman Kashyap [ISBN 0124005608] and "Fiber Bragg Gratings" by Andreas Othonos [ISBN 0890063443]. The variation in reflectivity is generally achieved by controlling the contrast of an optical exposure pattern, a technique that might be described as 'intensity modulation apodisation'. FIG. 1 shows how the local effective refractive index n varies along the waveguide at the end of a known apodised Bragg grating. The figure shows three regions. In region 1, which represents the end of the main part of the grating, the variation in refractive index (and thus the reflectivity at each period of the grating) is constant. In region 2, the variation in refractive index is gradually reduced, reducing the reflectivity of each period of the grating. In region 3 the refractive index is constant and this represents the region beyond the end of the grating.

Bragg gratings such as FBGs and DBRs are most commonly defined by holographic techniques, i.e. by means of an optical interference pattern. FBGs are typically 'written' with high intensity UV radiation, which is used to create patterned refractive index 'change' along the length of an optical fibre. In the case of DBRs the holographic pattern is used to create a lithographic exposure pattern on a photosensitive chemical resist (photoresist), which can then be developed and used as a lithographic etch mask to transfer a "binary" approximation of the interference pattern onto the semiconductor material (the pattern becomes binary due to the threshold of exposure of the photoresist, thus providing regions with and regions without photoresist).

Known FBGs are typically apodised by intensity modulating the holographic exposure. Typically the intensity variation is reduced at the ends of a grating to provide a weakening of the reflective strength of the grating in these regions and this can prevent or reduce the unwanted side peaks in the optical reflection spectrum of light transmitted along the fibre.

The approach of intensity modulation apodisation can also be applied to DBRs: a variable intensity exposure can be generated for exposing the photoresist. Adequate exposure of the photoresist requires a threshold 'dose' of light. An apodised holographic exposure pattern will lead to the formation of a photoresist etch mask with a corresponding variation in its mark:space ratio, which is then transferred to the semiconductor during the subsequent etch processing step. This is illustrated in FIGS. 2A and 2B, which show the end portions of a non-apodised grating 4 and a grating 5 apodised by changing exposure along its length. In the non-apodised grating 4 shown in FIG. 2A, the mark:space ratio between the widths of the marks 6 and spaces 7 remains constant as far as the end 8 of the grating. In the apodised grating 5 shown in FIG. 2B, the mark:space ratio decreases from 1:1 towards the end 9 of the grating, with a corresponding decay in reflection strength.

For first order gratings the reflective strength of the grating is greatest when the mark:space ratio is 1:1, and is weaker either side of this, which requires careful control of the exposure dose used in the lithographic pattern during manufacture. The objective of reducing the reflective strength in a region at the end of a DBR grating is typically achieved by either reducing or increasing the mark:space ratio in that region, by means of varying the exposure.

The exposure of photoresist and transfer of the exposure pattern to the semiconductor by etching can be difficult to control to a high level of precision. Consequently it is not uncommon for there to be a processing tolerance range for the mark:space ratio of the transferred pattern, which is, for example centred on the maximal grating strength (for a first order grating) of 1:1 mark:space ratio.

However, since the apodisation pattern relies upon the contrast of the exposure pattern being weakened at the ends of the grating, in order to produce a comparable change in the mark:space ratio, this can result in an undesirable feature for some of the gratings within the processing tolerance range: for some gratings, where the mark:space ratio is not exactly 1:1, the effect of apodisation may be that the grating strength initially increases as the ratio is changed before it decreases. This is illustrated in FIG. 2C, which shows the end portion 10 of a non-apodised grating with a mark:space ratio greater than 1:1, and apodised grating sections 11, 12 with successively reduced mark:space ratios. The first apodised section 11 has a mark:space ratio close to 1, leading to a greater reflective grating strength than the non-apodised section 10. This produces a grating with undesirable optical properties, and has a detrimental effect on manufacturing yield. This difficulty with controlling the mark:space ratio of the intensity modulation apodisation also applies to FBGs made by non-holographic techniques.

An alternative means for writing DBRs is by means of electron beam lithography (also known as "e-beam"). In this technique a lithographic resist is used that is sensitive to e-beam exposure (i.e. "e-beam resist"), and the desired lithographic pattern is written directly on the resist with the e-beam. Due to the directly programmable nature of the e-beam writer, this technique offers greater flexibility than the holographic technique in many respects, making it suitable for producing complex gratings. However, e-beam writers have limitations when producing intensity modulation apodisation.

A further alternative means for writing DBRs is by means of a photolithographic exposure mask. In this technique light, typically UV-light, is incident on a photoresist through an opaque photolithographic mask on an optically transparent plate. This technique is particularly suitable for higher order gratings. However, this technique is typically used with a constant level of illumination across the mask, and so is also not suitable for intensity modulation apodisation.

Thus there is a need in the art for an apodised grating that does not rely upon intensity modulation apodisation.

SUMMARY OF THE INVENTION

In accordance with one aspect of the present invention there is provided an apodised Bragg grating comprising a base grating section formed by a base order periodic pattern of marks and spaces, and an apodised grating section formed by a periodic pattern of marks and spaces defined by the base order pattern from which at least some of the marks are missing.

The reflective strength of the apodised grating section is reduced compared to the base grating section because fewer marks are present and the grating is thus apodised. This reduction in strength is achieved without the need to reduce the grating amplitude or to change the mark:space ratio (i.e. change the size of the individual marks). The apodised section still forms a binary grating section.

Preferably the pattern of the apodised grating section is defined by the base order pattern modulated by a higher order envelope function which determines which marks are missing from the base order pattern. This provides a simple scheme and means that the apodised grating section forms a higher order grating section with additional marks or spaces. The order of the higher order envelope may preferably be an odd multiple of the order of the base order pattern, since even order envelope functions may lead to out-coupling from the grating plane.

In a suitable scheme, one or two marks out of every three of the base order pattern are missing in the apodised grating section. In another suitable scheme, one, two, three or four marks out of every five of the base order pattern are missing in the apodised grating section. Generally speaking, a number of marks between one and N−1, out of every N marks in the base order pattern, may be missing in the apodised grating section, where N is a positive integer.

Preferably one or more further apodised sections are provided having a different pattern of missing marks from the original apodised section. The apodised grating sections may be placed adjacent to each other in such a way that the reflective strength of each successive section is lower than the preceding section. This achieves a gradual decay in the reflective strength of the grating.

A short-hand notation may be used to define the pattern in the apodised grating sections. The pattern of marks and spaces can be defined as "x/m", where "m" is the order of the higher order modulation envelope function compared to the base order, and "x" is the number of marks of the base order pattern remaining per period of the envelope function. A grating may therefore comprise successive grating sections with "x/m" patterns defined by 1/1, 4/5, 2/3, 1/3, 1/5, respectively. However, it will be appreciated that other schemes may be used.

In accordance with another aspect of the invention there is provided a binary apodised Bragg grating comprising a concatenation of grating sections, each section comprising a periodic base order pattern of marks and spaces modulated by a higher order binary envelope function of a mark density such as to produce a desired apodisation characteristic of the whole grating.

The grating is preferably a distributed Bragg grating. The grating may be a Fibre Bragg Grating (FBG), or a Distributed Bragg Reflector (DBR), for example. The grating may be a constant pitch grating or a chirped grating. Alternatively the grating could be a phase change grating, segmented grating or any other type of grating known in the art.

The invention also provides an optoelectronic device comprising a grating as described above, and a laser comprising a gain section bounded at one or both ends by such a grating.

In accordance with a further aspect of the invention there is provided a method of manufacturing an apodised Bragg grating, comprising forming a base grating section comprising a base order periodic pattern of marks and spaces, and forming one or more apodised grating sections, each comprising a periodic pattern of marks and spaces formed by the base order pattern from which at least some of the marks are missing. The marks and spaces may be formed in a waveguide using electron beam lithography.

BRIEF DESCRIPTION OF THE DRAWINGS

Some preferred embodiments of the invention will now be described by way of example only and with reference to the accompanying drawings, in which:

FIG. 3 is a schematic diagram of section of a binary Bragg grating 20 formed in a waveguide. The grating is formed by a periodic variation in the refractive index n of the waveguide along its length, and comprises a plurality of marks 21 and spaces 22. In the section shown in FIG. 3, the mark:space ratio is 1:1 and the grating is first order (with respect to the light in the waveguide).

FIG. 4A shows a fifth order binary envelope function 23 which can be used to modulate the grating section 20, such that every fifth mark of the first order grating is 'deleted' to produce a new grating section 24, as shown in FIG. 4B. This produces a grating section with a lower reflectivity than the complete first order grating section 20. It may be visualised either as a first order grating section with every fifth line deleted, or as a combination of a first order and a fifth order pattern.

Figure 1:
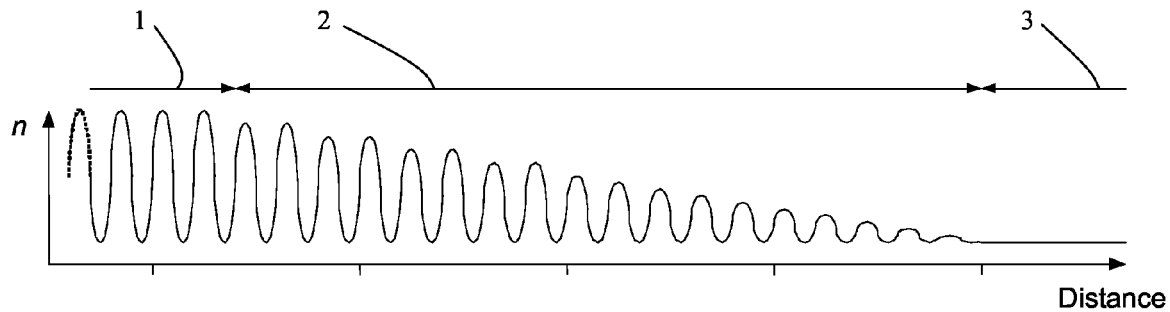
FIG. 1 is a simplified schematic illustration of the local effective refractive index of an intensity modulated grating end.
Figure 2A:
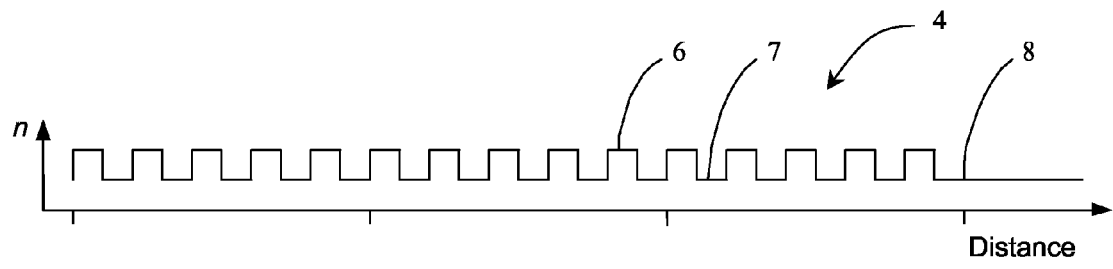
FIG. 2A shows the end portions of a non-apodised grating.
Figure 2B:
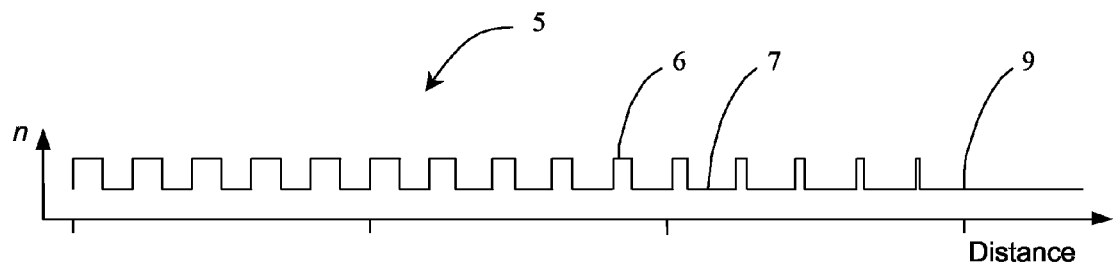
FIG. 2B shows the end portion of a grating apodised by changing mark:space ratio along its length.
Figure 2C:
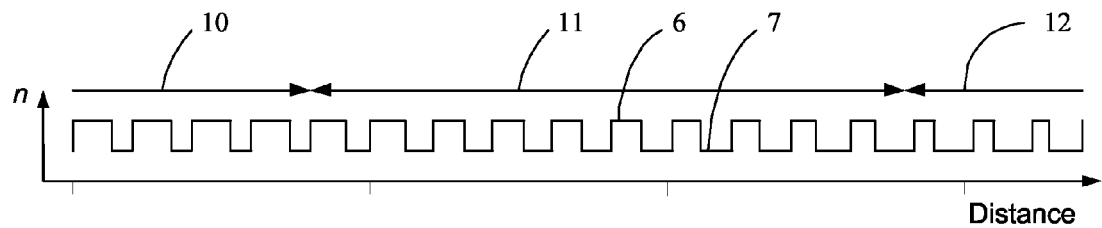
FIG. 2C shows a portion of apodised grating that is apodised by changing mark:space ratio along its length adjoining a portion of non-apodised grating.
Figure 3:
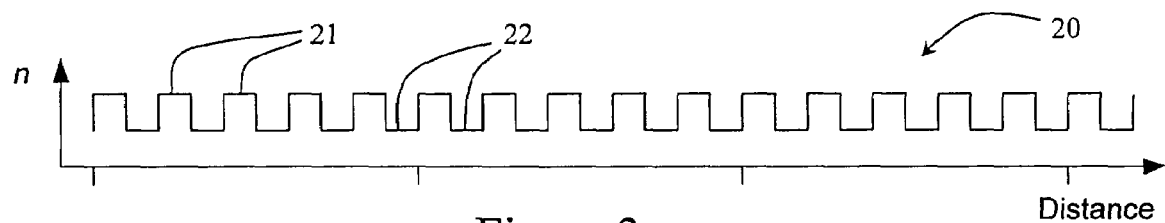
FIG. 3 is a schematic diagram of section of a binary Bragg grating formed in a waveguide.
Figure 4A:
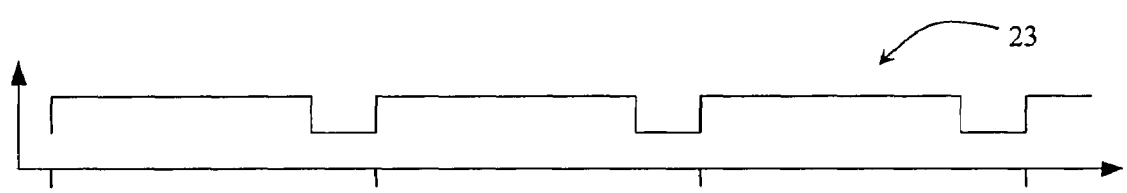
FIG. 4A is a schematic diagram of a fifth order binary envelope function for modulating the grating section shown in FIG. 3.
Figure 4B:
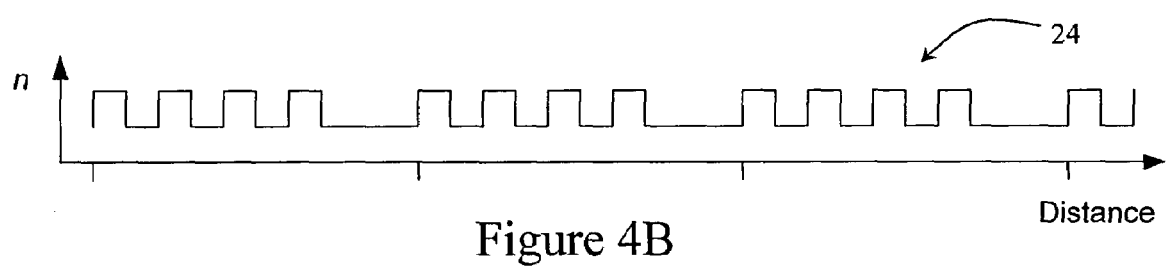
FIG. 4B shows the grating of FIG. 3 modulated by the envelope function of FIG. 4A.

A useful short-hand notation may be used to describe the resultant design of grating, type "x/m", where m is the order of the modulation envelope function compared with the base order, and where x is the number of marks per period of the envelope function rebased with respect to the base order. In the modified grating section 24 shown in FIG. 4B the modulation function 23 is fifth order compared to the base first order grating section 20 (so m=5) and four marks remain per envelope period (so x=4). The grating section 24 shown in FIG. 3B is thus denoted 4/5 type, and is itself a fifth order grating section.

Figure 5A:
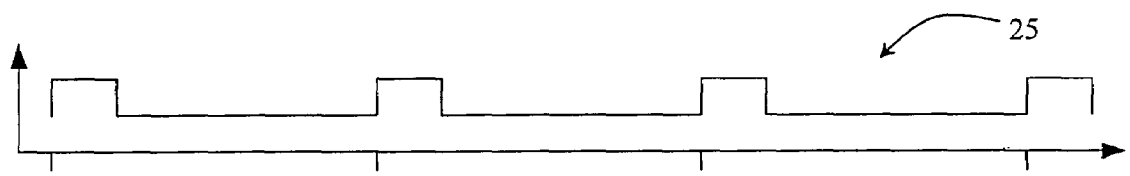
FIGS. 5A and 5B show a different fifth order binary envelope function and grating modulated thereby.
Figure 5B:
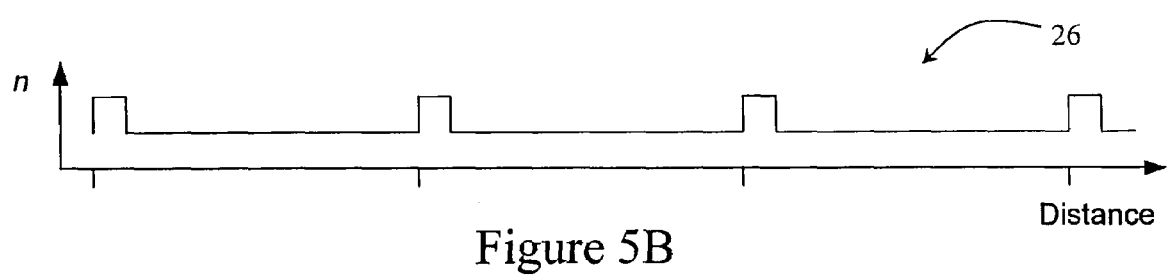

A different fifth order binary envelope 25 and corresponding 1/5 type grating section 26 are shown in FIGS. 5A and 5B. The reflection strength of the 1/5 type grating section 26 is lower still than that of the 4/5 type grating section 24. Generally speaking, the reflective strength of a grating section corresponds to its x/m value relative to the base grating section.

Figure 6:
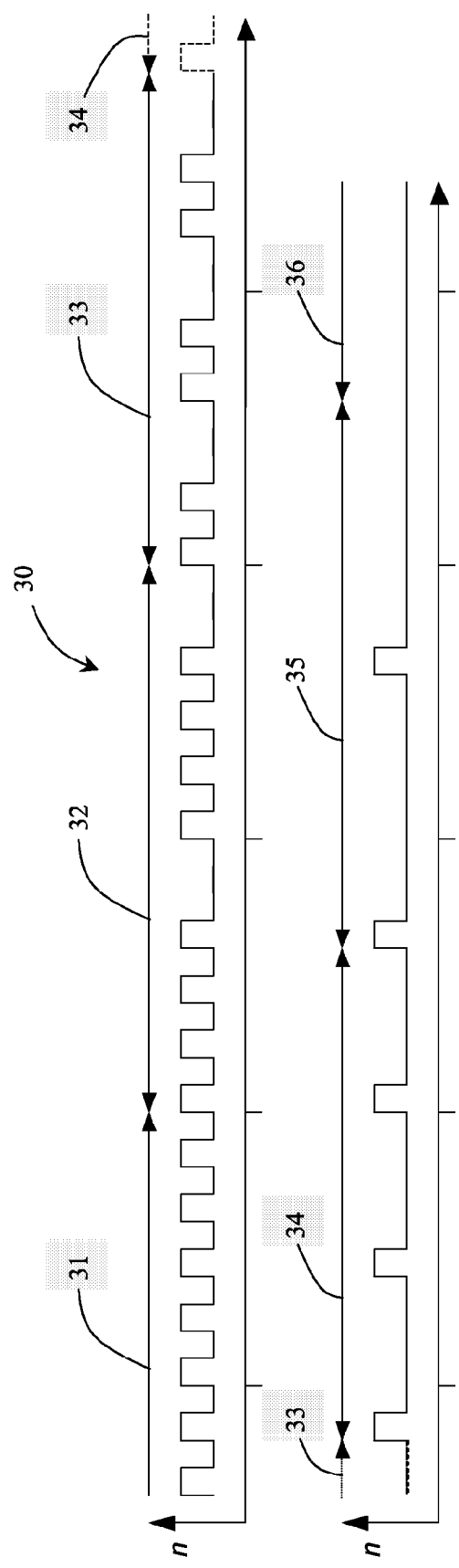
FIG. 6 is a schematic diagram of the apodised end section of a binary grating.

FIG. 6 shows schematically a simple exemplary arrangement 30 which produces an apodised end to a grating. The arrangement comprises a first grating section 31 comprising the end of a 1/1 type (first order) grating. Adjacent to this is a second section 32, similar to the section 24 of FIG. 3B, comprising a 4/5 type (fifth order) grating (in which one out of every five lines is missing compared to the 1/1 section). This is followed by a third section 33 of a 2/3 type (third order) grating (in which one out of every three lines is missing).

Fourth, fifth and sixth sections 34, 35, 36 follow of grating types 1/3, 1/5 and 0/1, respectively. In the fourth section 34 two out of every three lines is missing, and in the fifth section 35 four out of every five lines is missing compared to the 1/1 section. In the sixth section 36 (0/1 type) there are no lines left and the grating has terminated. It will be appreciated that FIG. 6 is illustrative and that, in practice, a real grating would probably have considerably more repetitions of each grating pattern within each grating section and may have a larger number of grating sections.

It will be noted that the grating sections shown in FIG. 6 are all first, third and fifth orders. This is because, in practice, second order (and all even order) gratings may be unfavourable since they may lead to out-coupling from the grating plane. It may therefore be desirable to use only odd grating orders to tailor the grating strength to give a reasonably smooth decay at the ends of the grating.

Figure 7A:
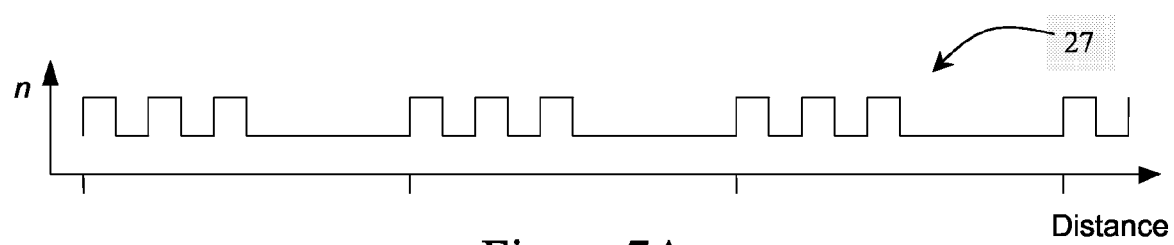
FIGS. 7A and 7B are schematic diagrams of grating sections in which two out of every five lines of a first order grating are missing.
Figure 7B:
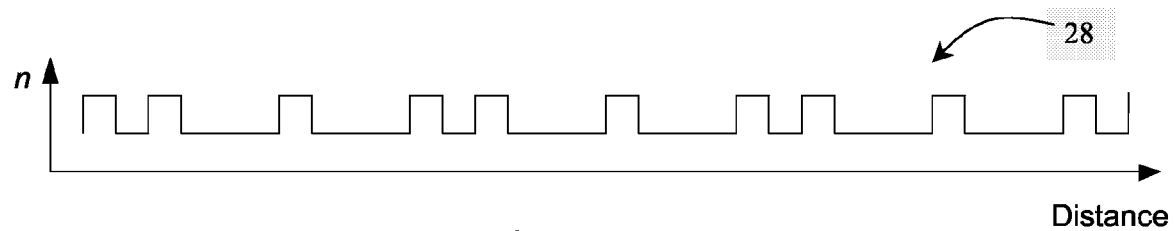

Other x/m arrangements are also possible while keeping to odd order gratings. FIGS. 7A and 7B show two possible arrangements for 3/5 type grating sections 27, 28, in which two out of every five lines of the first order grating section 20 are missing. It will be appreciated that any suitable arrangement may be used.

It will be appreciated that different x/m sections of a grating may have different lengths, in order to improve the approximation to an ideal apodisation profile. The optimal apodised grating strength profile is a substantially Gaussian profile for the whole grating structure. However, it is typically more convenient to manufacture the majority of the grating with a constant strength, with only the ends being apodised, each having an approximately half-Gaussian strength profile. Using the system described, the grating strength does not vary continuously, and instead is in the form of discrete strength steps. Non-uniform grating section lengths can be used to help approximate the desired profile.

At the interface between adjacent grating sections, there is preferably no gap, and there must be no phase shift between the different grating sections (i.e. all parts of the Bragg grating structure are in phase with each other).

Figure 8A:
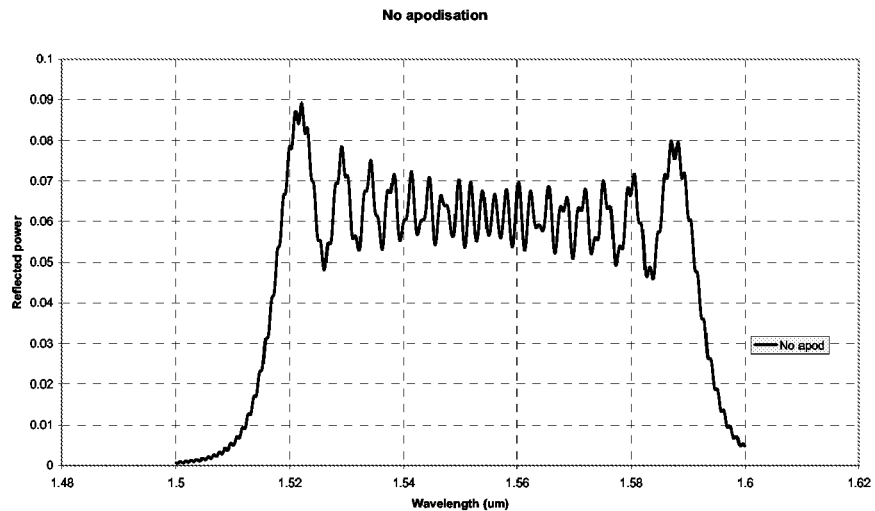
FIG. 8A illustrates the modelled reflection spectrum of a non-apodised chirp grating.
Figure 8B:
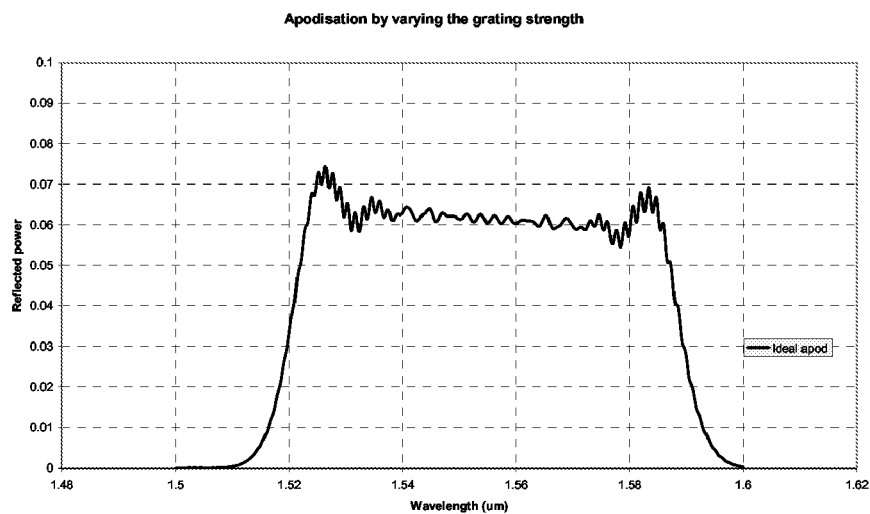
FIG. 8B illustrates the modelled reflection spectrum of a chirp grating apodised by reduction of the coupling coefficient at each end.
Figure 8C:
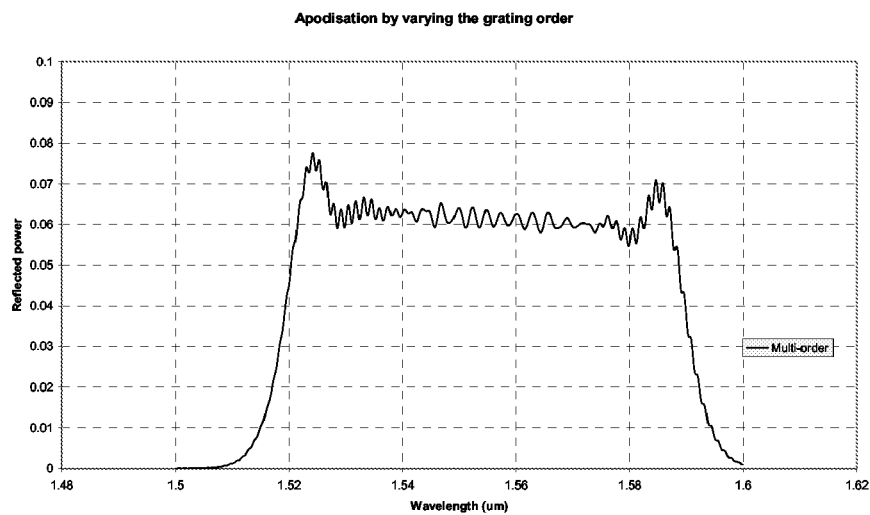
FIG. 8C illustrates the modelled reflection spectrum of a binary chirp grating apodised using a "deleted line" scheme.

FIG. 8A illustrates the modelled reflection response within a waveguide of a chirped grating with no apodisation, with respect to wavelength. It is apparent that the "top hat" profile is degraded by "ringing" and unwanted peaks, more notably at each end of the profile, caused by the abrupt ends of the grating. FIG. 8B illustrates the modelled response of a similar chirped grating with apodisation achieved by a monotonic reduction of the coupling coefficient over the last 25 µm (either by reduction of the mark:space ratio or the grating depth). It is clear that the apodisation reduces the ringing and end peaks. FIG. 8C illustrates the modelled response of a chirped binary grating where apodisation is achieved using a "deleted line" scheme as described above. It can be seen that the resultant profile is broadly similar to the situation where the coupling coefficient is reduced monotonically at the ends of the grating, which represents a significant improvement over the non-apodised case. Further, the chirped apodised binary grating is less sensitive to processing variations in the mark:space ration of the base grating, since that ratio can vary without affecting the shape of the apodisation profile.

DETAILED DESCRIPTION OF THE INVENTION

This invention is particularly suitable for manufacturing that uses an e-beam writer to define the grating, where the grating is built up on a line by line basis, and omitting lines or groups of lines is a straightforward task. However, it could also be applied to other lithographic techniques. For example, the pattern could be written onto a lithographic phase mask (possibly using e-beam lithography to do so) for holographic contact printing, which could then be used to avoid the use of an e-beam writer as part of a production line. The mask could alternatively be in the form of a conventional 'silhouette' style of lithographic mask.

Bragg gratings manufactured using the above technique may be used, for example, in a Distributed Bragg Reflector (DBR) laser such as that described in WO03/012936. However, it will be appreciated that they may be used with advantage in other semiconductor devices, such as: DFBs (distributed feedback lasers), which have a single section both producing gain and containing the grating; filters; multiplexers and demultiplexers. The design could also be used in the fabrication of FBGs, for example if the FBG was being formed by a non-holographic process, such as stamping the pattern into the waveguide. Further this design could be used in the fabrication of DBRs on vertical cavity surface emitting lasers (VCSELs).

It will also be appreciated that the gratings to which the described technique may be applied are not restricted to any one type of grating, such as constant pitch grating. It can also be applied to chirped gratings, phase change gratings, segmented gratings and other types of grating known in the art.

The invention claimed is:

1. An apodised Bragg grating comprising:
a base grating section having a base order periodic pattern of marks and spaces, and
an apodised grating section adjacent to the base grating section;
wherein the base order pattern of marks and spaces continues from the base grating section into the apodised grating section, and
wherein the base order pattern within the apodised grating section is configured as modulated by a periodic envelope function which is higher order than the base order so that some of the marks of the base order pattern are missing in a periodically repeating manner, the apodised grating section having a configuration of the pattern of marks and spaces defined as "x/m", where "m" is the order of the envelope function and "x" is the number of marks of the base order pattern remaining per period of the envelope function.

2. A grating as claimed in claim 1, wherein a number of marks between one and N−1 out of every N of the base order pattern are missing in the apodised grating section, where N is an integer greater than one.

3. A grating as claimed in claim 1, comprising one or more further apodised sections having a different pattern of missing marks from the apodised section.

4. A grating as claimed in claim 3, wherein the apodised grating sections are placed adjacent to each other in such a way that the reflective strength of each successive section is lower than the preceding section.

5. A grating as claimed in claim 1, comprising a plurality of apodised grating sections, each apodised grating section having a pattern of marks and spaces defined as "x/m", where "m" is the order of the envelope function and "x" is the number of marks of the base order pattern remaining per period of the envelope function.

6. A grating as claimed in claim 5, comprising successive grating sections with "x/m" patterns defined by 1/1, 4/5, 2/3, 1/3, 1/5, respectively.

7. A binary apodised Bragg grating comprising a concatenation of grating sections, the grating pattern in each section being defined by a periodic base order pattern of marks and spaces wherein at least one grating section is configured as modulated by a periodic envelope function which is higher order than the base order so that some of the marks of the base order pattern are missing in a periodically repeating manner, the at least one grating section having a configuration of the pattern of marks and spaces defined as "x/m", where "m" is the order of the envelope function and "x" is the number of marks of the base order pattern remaining per period of the envelope function.

8. A grating as claimed in claim 1, which grating is a Fibre Bragg Grating (FBG) or a Distributed Bragg Reflector (DBR).

9. A grating as claimed in claim 1, which grating is a constant pitch grating.

10. A grating as claimed in claim 1, which grating is a chirped grating.

11. A grating as claimed in claim 1 in which all of the marks have substantially the same reflectivity.

12. An optoelectronic device comprising a grating as claimed in claim 1.

13. A laser comprising a gain section bounded at at least one end by a grating as claimed in claim 1.

14. A method of manufacturing an apodised Bragg grating, comprising forming a base grating section comprising a base order periodic pattern of marks and spaces, and forming one or more apodised grating sections,
wherein the base order pattern of marks and spaces continues from the base grating section into an adjacent apodised grating section, and
wherein the base order pattern within each apodised grating section is modulated by a periodic envelope function which is higher order than the base order so that some of the marks of the base order pattern are missing in a periodically repeating manner, the apodised grating section having a configuration of the pattern of marks and spaces defined as "x/m", where "m" is the order of the envelope function and "x" is the number of marks of the base order pattern remaining per period of the envelope function.

15. A method as claimed in claim 14, wherein the marks and spaces are formed in a waveguide using electron beam lithography.

* * * * *